United States Patent [19]

Doerner et al.

[11] Patent Number: 5,307,223
[45] Date of Patent: Apr. 26, 1994

[54] MAGNETIC RECORDING DISK FILE FOR CONTACT RECORDING

[75] Inventors: Mary F. Doerner, Los Gatos; Dan S. Parker, San Jose; Anthony W. Wu, San Jose; Tadashi Yogi, San Jose, all of Calif.

[73] Assignee: International Business Machines Corporation, Armonk, N.Y.

[21] Appl. No.: 926,488

[22] Filed: Aug. 7, 1992

[51] Int. Cl.$^5$ .............................................. G11B 5.012
[52] U.S. Cl. .................................. 360/97.01; 360/135
[58] Field of Search ...... 428/694 T, 694 TS, 694 TR, 428/694 ST, 694 SG, 64, 65; 360/135, 97.01; 427/129, 131

[56] References Cited

U.S. PATENT DOCUMENTS

| 4,072,781 | 2/1978 | Shirahata et al. | 428/900 |
|---|---|---|---|
| 4,167,765 | 9/1979 | Watrous | 360/103 |
| 4,621,030 | 11/1986 | Uesaka et al. | 360/135 |
| 4,696,845 | 9/1987 | Yanagisawa | 428/64 |
| 4,849,305 | 7/1989 | Yanagisawa | 428/694 |
| 5,041,932 | 8/1991 | Hamilton | 360/104 |
| 5,047,274 | 9/1991 | Tsuya et al. | 360/135 |

FOREIGN PATENT DOCUMENTS

| 50-1438 | 1/1975 | Japan . |
|---|---|---|
| 60-219638 | 11/1985 | Japan . |
| 61-96522 | 5/1986 | Japan . |
| 61-246380 | 11/1986 | Japan . |
| 63-140091 | 6/1988 | Japan . |

Primary Examiner—Stuart S. Levy
Assistant Examiner—Paul J. Ditmyer
Attorney, Agent, or Firm—Thomas R. Berthold

[57] ABSTRACT

A magnetic recording disk based on conventional disk technology has both an extremely smooth top surface and high coercivity, and is incorporated in a contact recording disk file which requires an extremely smooth head-disk interface and a disk with high coercivity. A superfinished untextured NiP coating on a disk substrate is oxidized to form a NiO film. The NiO film permits the subsequently sputter deposited magnetic layer to have much higher coercivity, which enables the disk to be used in contact recording applications. The NiO film and the later deposited layers making up the disk, including the top protective overcoat, conform to the smooth surface of the polished NiP, thus preserving the extremely smooth surface of the top layer of the disk, which is required for the head-disk interface in contact recording disk files. In the preferred process for forming the NiO film on the substrate, the substrate is annealed in air at a temperature below that which would cause the NiP film to crystallize.

7 Claims, 5 Drawing Sheets

MAGNETIC RECORDING DISK FILE FOR CONTACT RECORDING

RELATED APPLICATION

This application is related to concurrently filed pending application Ser. No. 07/926,986.

TECHNICAL FIELD

This invention relates to a thin film metal alloy magnetic recording disk, a process for making the disk, and to a disk file using the disk to provide an improved head-disk interface for contact recording.

BACKGROUND OF THE INVENTION

In conventional rotating rigid disk files, each of the read/write transducers (or heads) is supported on a carrier (or slider) which rides on a cushion or bearing of air above the surface of its associated disk when the disk is rotating at its operating speed. The slider is connected to a linear or rotary actuator by means of a relatively fragile suspension. There may be a stack of disks in the disk file with the actuator supporting a number of sliders. The actuator moves the sliders radially so that each head may access the recording area of its associated disk surface. In these conventional disk files the slider is biased towards the disk surface by a small force from the suspension. Because the slider is in contact with the disk surface from the time the disk file is turned on until the disk reaches a speed sufficient to cause the slider to ride on the air-bearing, and again in contact with the disk surface when the disk file is turned off and the rotational speed of the disk falls below that necessary to create the air-bearing, such disk files are referred to as contact start-stop (CSS) disk files. In CSS disk files it is not necessary that the disk surface be extremely smooth since the slider is only in contact during start and stop operations. Instead, it is desirable to texture the disk surface to reduce the static friction between the slider and the disk when the slider is at rest on the disk surface.

In addition to the above-described conventional CSS magnetic recording disk files, "contact" recording rigid disk files have been proposed. In one type of contact recording, referred to as "liquid bearing" contact recording, the head-disk interface includes a liquid film as a liquid bearing between the transducer carrier and the disk. An example of this type of contact recording disk file is described in assignee's pending application, U.S. Ser. No. 264,604, filed Oct. 31, 1988, and published May 9, 1990 as European published application EP 367510. In another type of contact recording, referred to as "dry" contact recording, the disk file uses an integrated head-suspension which makes physical contact with the disk surface during read and write operations. In this type of head-suspension, as described for example in U.S. Pat. No. 5,041,932, a portion of the head actually wears away due to frictional contact with the disk over the life of the disk file. In both types of contact recording disk files it is necessary, because of the close head-disk spacing, to make the disk surface extremely smooth.

One type of disk which has been used in rigid disk files is a thin film metal alloy disk which typically comprises a substrate, such as an aluminum-magnesium (AlMg) alloy with a nickel-phosphorous (NiP) surface coating, a cobalt-based alloy, such as a CoPt or CoNi alloy, sputter deposited as the magnetic layer on the substrate, and a protective overcoat, such as a sputter-deposited amorphous hydrogenated carbon film, formed on the magnetic layer. In addition to the magnetic layer and the protective overcoat, thin film disks may also include a sputter deposited underlayer, such as a layer of chromium (Cr), chromium-vanadium (CrV) or tungsten (W), between the substrate and the magnetic layer and a sputter deposited adhesion layer, such as a Cr, W or titanium (Ti) layer, between the magnetic layer and the protective overcoat. While this conventional disk is adequate for use in CSS disk files, it has been found that when the AlMg-NiP substrate is made very smooth, as required if the disk is to be used in contact recording disk files, it is not possible to manufacture the disk in the conventional manner and still achieve the required disk coercivity.

Thus what is needed is an improved thin film metal alloy magnetic recording disk, based upon the conventional disk technology, which is usable in contact recording disk files so that such files can have both the required smooth head-disk interface and disk coercivity.

SUMMARY OF THE INVENTION

The present invention is a magnetic recording disk and process for making the disk, and a contact recording disk file with an improved head-disk interface and magnetic recording properties. A superfinished untextured NiP coating on a disk substrate is oxidized to form a NiO film. The NiO film permits the subsequently sputter deposited magnetic layer to have much higher coercivity, which enables the disk to be used in contact recording applications. The NiO film and the later deposited layers making up the disk conform to the smooth surface of the polished NiP, thus preserving the extremely smooth surface of the top layer of the disk, which is required for contact recording disk files.

In the preferred process for forming the NiO film on the substrate, the substrate is annealed in air at a temperature below that which would cause the NiP film to crystallize.

For a fuller understanding of the nature and advantages of the present invention, reference should be made to the following detailed description taken in conjunction with the accompanying drawings.

DESCRIPTION OF THE PREFERRED EMBODIMENTS

Figure 1:
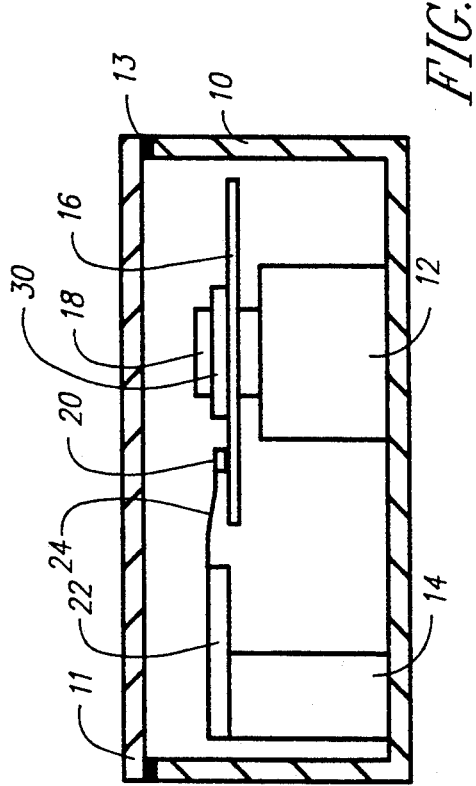
FIG. 1 is a side view in partial section illustrating schematically the major components of a liquid bearing contact recording disk file.

Referring first to FIG. 1, there is illustrated in sectional view a schematic of the liquid bearing contact recording embodiment of the disk file of the present invention. The disk file comprises a base 10 to which are secured a disk drive motor 12 and an actuator 14, and a cover 11. The base 10 and cover 11 provide a substantially sealed housing for the disk drive. Typically there is a gasket 13 located between base 10 and cover 11 and a small breather port (not shown) for equalizing pressure between the interior of the disk file and the outside environment. This type of disk file is described as being substantially sealed since the drive motor 12 is located entirely within the housing and there is no external forced air supply for cooling the interior components. A magnetic recording disk 16 is mounted on a hub 18, which is attached for rotation by drive motor 12. A read/write head or transducer (not shown) is formed on a transducer carrier 20. The carrier 20 is connected to the actuator 14 by means of a rigid arm 22 and a suspension 24, the suspension 24 providing a biasing force which urges the transducer carrier 20 onto the surface of the recording disk 16. During operation of the disk file the drive motor 12 rotates the disk 16 at a constant speed, and the actuator 14, which is typically a linear or rotary voice coil motor (VCM), moves the transducer carrier 20 generally radially across the surface of the disk 16 so that the read/write head may access different data tracks on disk 16.

Figure 2:
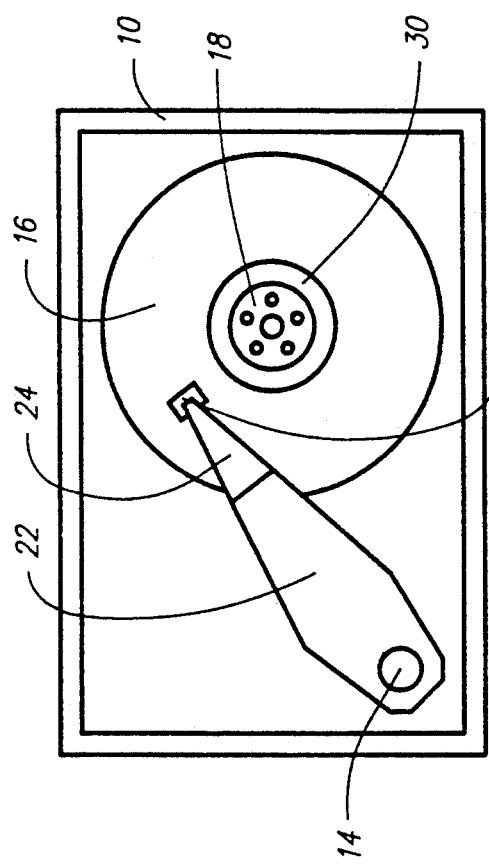
FIG. 2 is a top view of the disk file of FIG. 1 with the cover 11 removed.

FIG. 2 illustrates a top view of the interior of the disk file with the cover 11 removed and illustrates an annular lubricant reservoir 30, which serves as a means for holding a supply of liquid lubricant for replenishment of lubricant on the surface of disk 16. A thin continuous film of lubricant is maintained on the surface of disk 16 and is replenished by lubricant from the reservoir 30 during operation. FIG. 2 also illustrates in better detail the suspension 24 which provides a force to the carrier 20 to maintain the carrier into contact with the lubricant film on the disk 16. The suspension may be a conventional type of suspension such as that used in magnetic disk files which have an air-bearing slider. An example is the well-known Watrous suspension, as described in assignees' U.S. Pat. No. 4,167,765. This type of suspension also provides a gimballed attachment of the transducer carrier which allows the carrier to pitch and roll as it rides on the liquid lubricant film.

Figure 3:
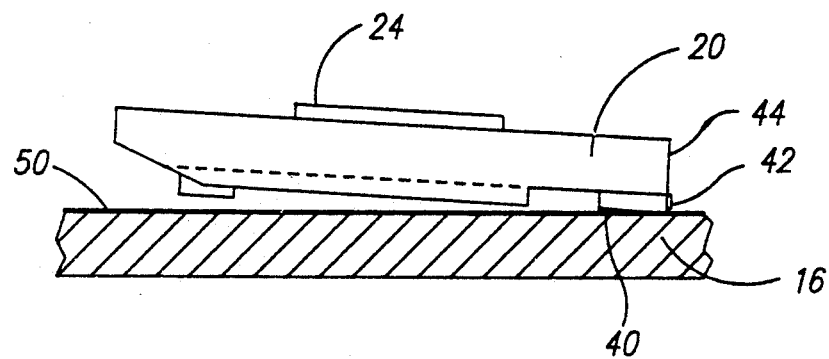
FIG. 3 is an illustration of the head-disk interface of a liquid-bearing contact recording disk file.

FIG. 3 illustrates a side view of the transducer carrier 20 and a sectional view of the disk 16 in the liquid bearing contact recording embodiment of the present invention. The carrier 20 has a ski foot 40 near its rear end and a head 42 located on its trailing edge 44. The ski foot 40 is in contact with a liquid film 50 on disk 16 and is maintained in contact during read or write operations by the bias force supplied by the attached suspension 24.

Figure 4:
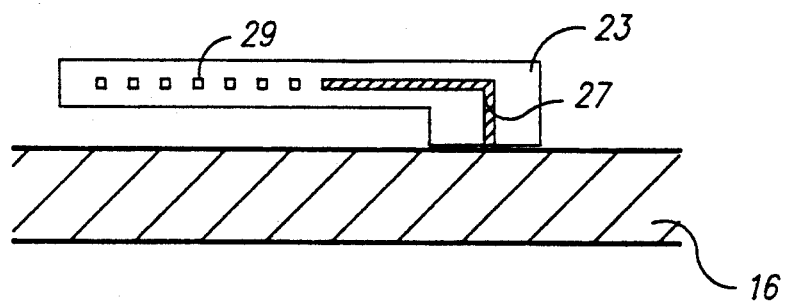
FIG. 4 is an illustration of the head-disk interface of a dry contact recording disk file.

FIG. 4 illustrates a side sectional view of an integrated head-suspension 23 and a sectional view of the disk 16 in the dry contact recording embodiment of the present invention. The integrated head-suspension 23 serves the function of both the suspension 24 and the carrier 20 in the liquid bearing embodiment of FIG. 3. In contrast, however, the transducer, shown as a pole tip 27 and coil 29, is embedded within the integrated head-suspension 23. There is no liquid film on the surface of disk 16, which eliminates the need for a lubricant reservoir, and the head-suspension 23 makes direct contact with the surface of disk 16 during read and write operations.

Figure 5:
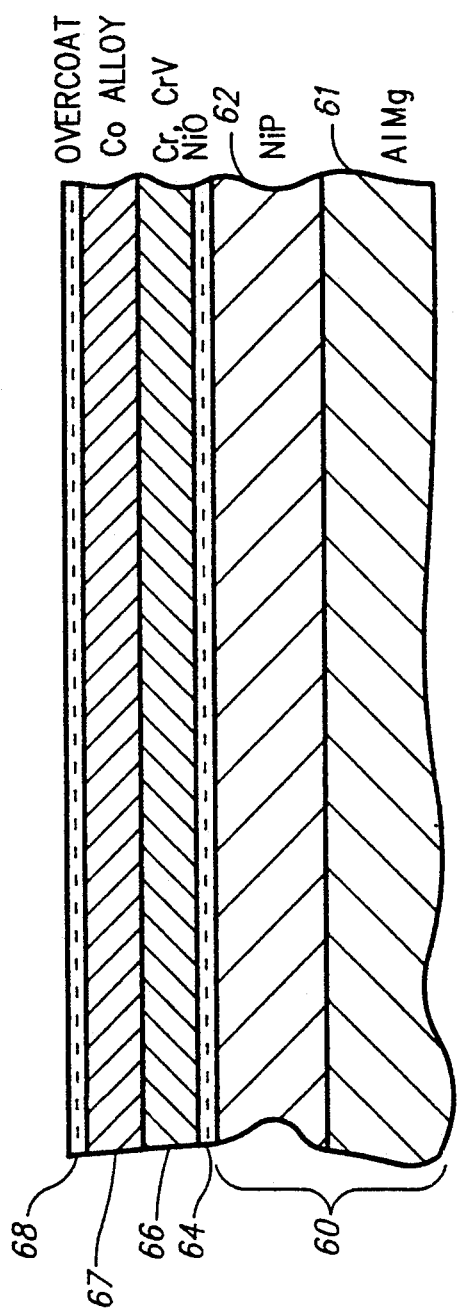
FIG. 5 is a sectional view of the disk of the present invention illustrating the various disk layers.

Referring now to FIG. 5, the disk 16 of the present invention is illustrated in sectional view. The disk substrate 60 comprises a an AlMg base 61 with a NiP surface coating 62. The substrate is a commercially available disk substrate available from several vendors, such as Toyo Kohan and Nippon Light Metals. The AlMg is typically 5586 aluminum alloy and the NiP is electrolessly deposited to a thickness of approximately 10-15 microns. In applications for contact recording it is necessary that the surface of the NiP coating 62 be extremely smooth. Thus the NiP coating 62 is polished by various known techniques, such as mechanical polishing with $Al_2O_3$ abrasive, so as to have an arithmetic average surface roughness ($R_a$) of approximately 10 Angstroms or less. A nickel oxide film 64, consisting essentially of NiO, is then formed on the NiP coating 62 by either of the techniques described below. The thickness of the NiO film 64 is not critical, provided it is thick enough to control the nucleation of the underlayer, which has been found to be in the range of approximately 10-30 Angstroms. Following the formation of the NiO film 64, the remaining well known layers of the disk 16 are formed in the conventional manner by sputter deposition. These include a Cr or CrV underlayer 66 to a thickness of approximately 200 to 1200 Angstroms, a Co alloy magnetic layer 67, such as a CoPtCr or CoNi alloy, to a thickness of approximately 100 to 500 Angstroms, and a hydrogenated carbon protective overcoat 68, sputter deposited from a carbon target in the presence of hydrogen, to a thickness of approximately 250 Angstroms. Because the subsequently deposited layers are conformal to the surface of the substrate, it is necessary that the substrate surface (i.e. the surface of the NiP surface coating 62) be extremely smooth in order that the surface of the protective overcoat 68 presents an extremely smooth interface for the head, as required in contact recording disk files.

In the preferred process for forming the NiO film 64, the substrate 60 is washed and then placed in a chamber where it is heated in air to a temperature in the range of 100-200 degrees C. for approximately 20 to 60 minutes. The temperature must be maintained below approximately 250 degrees C., which is the temperature at which the amorphous NiP may crystallize. As a result of this oxidation process it has been found that a film consisting essentially of NiO is formed to a thickness of approximately 10-30 Angstroms on the NiP coating 64. While testing of the oxide film has confirmed that the clearly predominant constituent is NiO, other oxides, such as $NiO_2$ and $Ni_2O_3$, could also be present. By comparison, testing of the surface of the NiP coating 62 after washing indicated a native oxide layer having a thickness of approximately 15 Angstroms, but with no significant NiO.

In an alternative process for forming the NiO film 64, the oxidation is achieved by sputter etching in the presence of oxygen. The substrate 60 is placed in the vacuum chamber and the NiP surface coating 62 is sputter etched in an argon (Ar) atmosphere containing approximately 10% $O_2$. Immediately thereafter and without breaking vacuum the subsequent disk layers 66,67,68 are sputter deposited.

Figure 6:
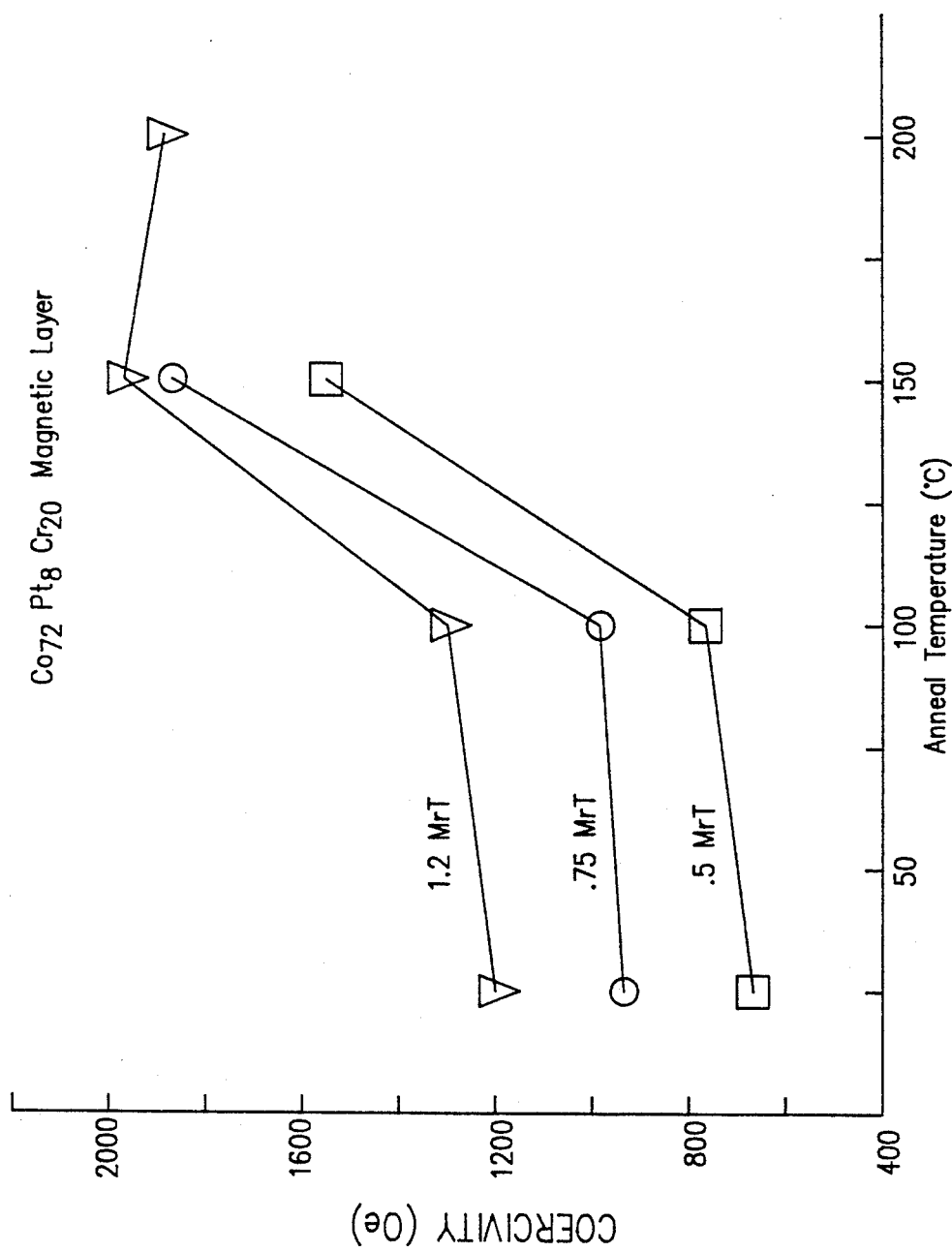
FIG. 6 is a graph of coercivity as a function of anneal temperature for disks with and without the oxide film formed by air annealing.
Figure 7:
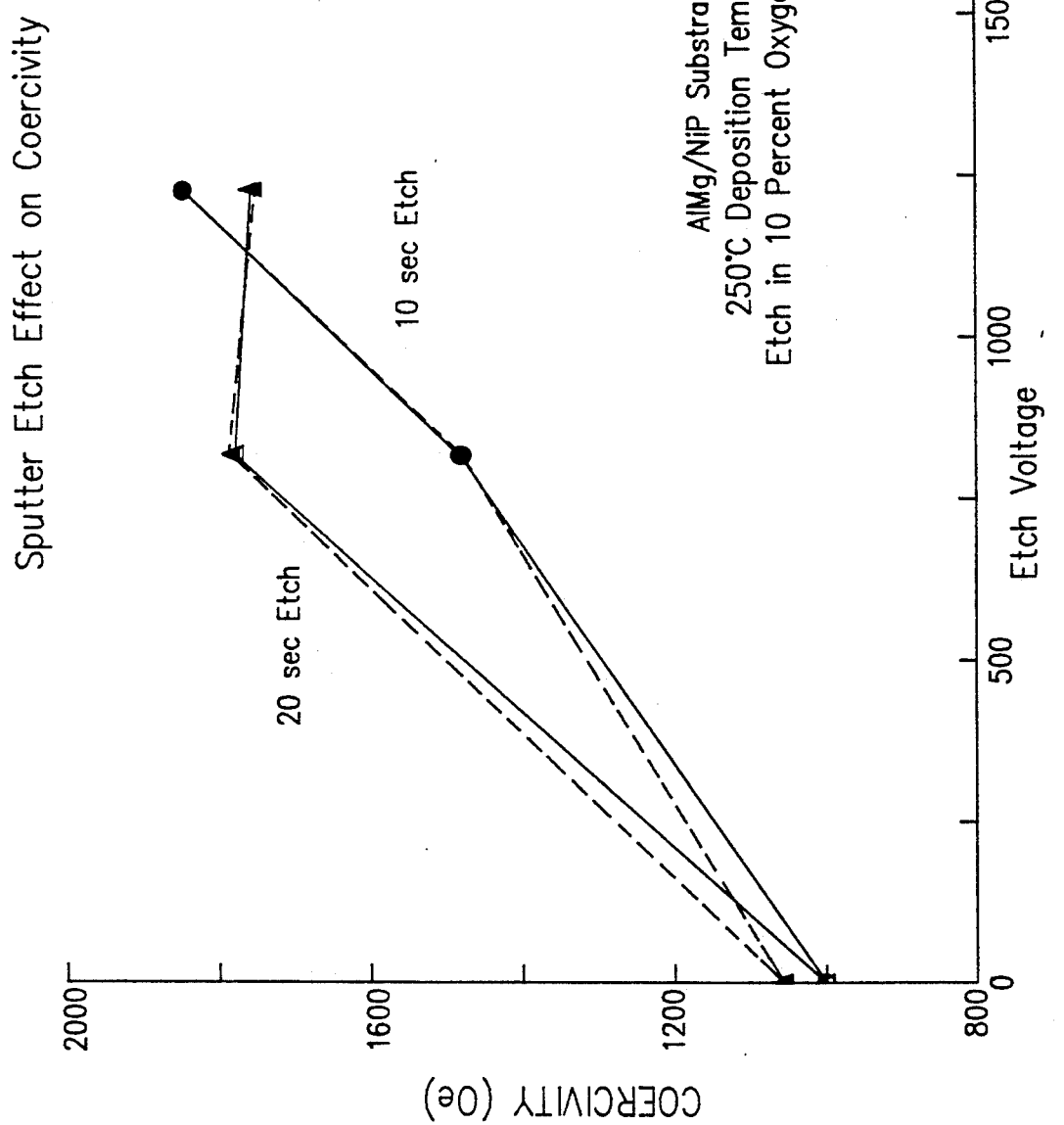
FIG. 7 is a graph of coercivity as a function of etch voltage for disks with and without the oxide film formed by sputter etching in an $O_2$-Ar atmosphere.

The improvement in disk coercivity by the oxidation of the NiP surface coating is illustrated in FIGS. 6 and 7. In FIG. 6, disks with different values of remanence-thickness product ($M_r$\*t) and with $Co_{78}Pt_8Cr_{20}$ magnetic layers were fabricated on superfinished ($R_a=7$ Angstroms) substrates with and without the NiO films formed by annealing in air. As shown, there is a significant increase in coercivity for those disks having the NiO films formed by annealing in the range of 100-200 degrees centigrade for 60 minutes. For example, the coercivity of the disk with $M_r*t=0.75$ memu/cm$^2$ is increased from 900 Oe (no NiO film) to 1850 Oe when a NiO film is formed by air annealing at 150 degrees C. for 60 minutes. In FIG. 7, similar disks were fabricated on superfinished substrates which had been sputter etched in a 10% $O_2$ in Ar atmosphere at 750 and 1250 sputter etch voltages for 10 and 20 seconds. As shown, there is a significant increase in coercivity for the disks which had the substrates sputter etched. For example, a 10 second sputter etch increases the coercivity from 1000 Oe to 1300 Oe when done at 750 volts, and from 1000 Oe to 1850 Oe when done at 1250 volts.

It has also been found that the oxidation of the superfinished NiP coating provides other improvements in the disks. The polishing of the NiP leaves some residual scratches in the surface. These scratches can result in magnetic anisotropy with enhanced coercivity and squareness along the scratch direction. Since the residual scratches are not aligned parallel to the recording track direction, the anisotropy produces undesirable signal amplitude modulation. The formation of the NiO film on the NiP coating significantly reduces this modulation by altering the crystallographic orientation of the underlayer and magnetic layer.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording disk file for contact recording comprising:
    a magnetic recording disk, the disk further comprising a substrate of an aluminum alloy having a nickel-phosphorous surface coating, a film comprising nickel oxide formed on the nickel-phosphorous coating, an underlayer formed over the nickel oxide film, and a magnetic layer comprising a cobalt-based alloy formed over the underlayer;
    means connected to the disk for rotating the disk;
    a head for reading data to or writing data from the magnetic layer on the disk;
    means for supporting the head, the head support means being urged into contact with the disk during read or write operations; and
    means connected to the head support means for moving the head across the disk.

2. A disk file according to claim 1 wherein the disk includes a protective overcoat formed over the magnetic layer.

3. A disk file according to claim 1 wherein the nickel-phosphorous coating has an arithmetic average surface roughness of approximately 10 Angstroms.

4. A disk file according to claim 3 wherein the disk has a coercivity of approximately 1800 Oersteds.

5. A disk file according to claim 1 wherein the underlayer comprises chromium or an alloy of chromium and vanadium.

6. A disk file according to claim 1 wherein the disk includes a liquid bearing film on its surface and wherein the head supporting means further comprises a head carrier, the carrier being urged into contact with the liquid bearing film during read or write operations.

7. A disk file according to claim 1 wherein the head and head support means form an integrated head-suspension, the head-suspension being urged into contact with the disk during read or write operations.

* * * * *